United States Patent
Kånge et al.

(10) Patent No.: US 11,464,197 B2
(45) Date of Patent: Oct. 11, 2022

(54) ARRANGEMENT AND METHOD FOR CLASSIFYING TEATS WITH RESPECT TO SIZE MEASURES

(71) Applicant: DELAVAL HOLDING AB, Tumba (SE)

(72) Inventors: Fredrik Kånge, Tumba (SE); Arto Rajala, Tumba (SE); Nils Älveby, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 900 days.

(21) Appl. No.: 16/328,019

(22) PCT Filed: Aug. 24, 2017

(86) PCT No.: PCT/SE2017/050855
§ 371 (c)(1),
(2) Date: Feb. 25, 2019

(87) PCT Pub. No.: WO2018/038673
PCT Pub. Date: Mar. 1, 2018

(65) Prior Publication Data
US 2019/0191658 A1    Jun. 27, 2019

(30) Foreign Application Priority Data

Aug. 25, 2016    (SE) .................... 1651141-2

(51) Int. Cl.
*A01J 5/00*    (2006.01)
*A01J 5/007*    (2006.01)
(Continued)

(52) U.S. Cl.
CPC .............. *A01J 5/007* (2013.01); *A01J 5/0175* (2013.01); *G01B 11/022* (2013.01);
(Continued)

(58) Field of Classification Search
CPC ........ A01J 5/007; A01J 5/0175; A01J 5/0075; A01J 5/017; G01B 11/022; G01B 11/024; G06T 7/00; G06T 7/60
See application file for complete search history.

(56) References Cited

U.S. PATENT DOCUMENTS

| | | |
|---|---|---|
| 5,412,420 A | 5/1995 | Ellis |
| 6,427,625 B1 | 8/2002 | Schuster |

(Continued)

FOREIGN PATENT DOCUMENTS

| | | | |
|---|---|---|---|
| GB | 2531928 | * | 10/2014 |
| WO | 2010/046669 A1 | | 4/2010 |

(Continued)

OTHER PUBLICATIONS

Office Action issued in European Patent Application No. 17 761 612.5 dated Dec. 2, 2020.
(Continued)

*Primary Examiner* — Qian Yang
(74) *Attorney, Agent, or Firm* — Nixon & Vanderhye

(57) ABSTRACT

A three-dimensional camera of an automatic milking system records image data representing an outer surface of a teat of a dairy animal in three dimensions. Based on the image data, a processing unit performs a geometric analysis and calculates at least one size measure of the teat. A user interface presents output data reflecting the size-related classification of the teat.

16 Claims, 3 Drawing Sheets

(51) Int. Cl.
  *A01J 5/017*   (2006.01)
  *G06T 7/00*    (2017.01)
  *G06T 7/60*    (2017.01)
  *G01B 11/02*   (2006.01)

(52) U.S. Cl.
  CPC ............ *G01B 11/024* (2013.01); *G06T 7/00* (2013.01); *G06T 7/60* (2013.01)

(56) References Cited

U.S. PATENT DOCUMENTS

| | | |
|---|---|---|
| 9,510,553 B2 | 12/2016 | Anglart et al. |
| 2010/0154722 A1 | 6/2010 | Van Den Berg et al. |
| 2011/0245975 A1 | 10/2011 | Daubner et al. |
| 2014/0000520 A1 | 1/2014 | Bareket |
| 2014/0029797 A1 | 1/2014 | Eriksson |
| 2015/0071491 A1 | 3/2015 | Fedorenko et al. |

FOREIGN PATENT DOCUMENTS

| | | |
|---|---|---|
| WO | 2012/134379 A1 | 10/2012 |
| WO | 2013/187821 A1 | 12/2013 |
| WO | 2014/055001 A1 | 4/2014 |

OTHER PUBLICATIONS

International Search Report and Written Opinion, dated Nov. 15, 2017, from corresponding PCT application No. PCT/SE2017/050855.

Swedish Search Report, dated Mar. 23, 2017, from corresponding SE application No. 1651141-2.

\* cited by examiner

| CATEGORY | MEASURES (L x $W_{avg}$) | # TEATS |
|---|---|---|
| SHORT & THIN | < 35 mm x < 24 mm | 10 |
| SHORT & AVERAGE | < 35 mm x 24-27 mm | 20 |
| SHORT & WIDE | < 35 mm x > 27 mm | 10 |
| AVERAGE & THIN | 35-60 mm x < 24 mm | 20 |
| AVERAGE | 35-60 mm x 24-27 mm | 10 |
| AVERAGE & WIDE | 35-60 mm x > 27 mm | 20 |
| LONG & THIN | > 60 mm x < 24 mm | 10 |
| LONG & AVERAGE | > 60 mm x < 24-27 mm | 20 |
| LONG & WIDE | > 60 mm x > 27 mm | 10 |

ARRANGEMENT AND METHOD FOR CLASSIFYING TEATS WITH RESPECT TO SIZE MEASURES

THE BACKGROUND OF THE INVENTION AND PRIOR ART

The present invention relates generally to solutions for adapting automatic milking installations to the animals being milked. More particularly the invention relates to an arrangement according to the preamble of claim 1 and a corresponding method. The invention also relates to a computer program and a processor-readable medium.

For improved efficiency and to reduce the risk of mastitis and other problems related to the mechanical stress to which the teats of a dairy animal are subjected during milking it is important to use a teatcup liner that suits the teat. In order to identify such a teatcup liner, the geometric properties of the teat must be determined.

WO 2013/187821 describes an arrangement for determining teat positions and breeding rating in a milking system. The arrangement includes a milking stall for housing the milking animal during milking, a movable robot arm for automatically attaching teat cups to the teats of the milking animal in the milking stall, and a control device for controlling the movement of the robot arm based on determined positions of the teats of the milking animal. The arrangement contains a three-dimensional camera directed towards the udder of the milking animal in the milking stall and provided to repeatedly record three-dimensional images of the udder of the milking animal; and processing means provided to repeatedly detect the teats of the milking animal and determine their positions based on the repeatedly recorded three-dimensional images. Further, the processing means is arranged to automatically determine the shapes of the teats of the milking animal based on the repeatedly recorded three-dimensional images and to calculate a breeding rating based on the determined shapes of the teats of the milking animal.

Problems Associated with the Prior Art

The known solution may be capable of determining certain geometric properties of a teat. However, there is nothing in this solution to suggest that a particular teatcup liner be selected based on the determined teat geometry.

SUMMARY OF THE INVENTION

The object of the present invention is therefore to offer a solution which is capable of identifying a suitable teatcup liner for a given animal.

According to one aspect of the invention, the object is achieved by the initially described arrangement, wherein the processing unit is configured to calculate at least one size measure of the teat based on the image data recorded by the three-dimensional (3D) camera. Specifically, the processing unit is configured to analyze the teat geometrically to determine a size-related classification of the teat based on the at least one size measure. The arrangement also contains a user interface configured to present output data that reflect the size-related classification of the teat.

Here, the term 3D camera is understood to include any type of image-based structural data registration apparatus, e.g. a time-of-flight (ToF) camera, a light-pattern-projection based image registering unit, for example a structured-light 3D scanner, or a stereo camera.

The proposed arrangement is advantageous because it facilitates selecting a suitable teatcup liner, either for an entire livestock of dairy animals, or for each of two or more subgroups of the livestock. Namely, preferably, the size-related classification of the teat is associated with a recommended teatcup liner for the dairy animal. Thus, based on this association, the processing unit may be further configured to determine a recommended teatcup liner for the dairy animal.

According to one embodiment of this aspect of the invention, the processing unit is configured to calculate the at least one size measure of the teat based on image data recorded in the form of at least two images. Thereby, relatively accurate geometric data can be derived also if each individual image has comparatively low resolution.

According to another embodiment of this aspect of the invention, the processing unit is specifically configured to combine image data from at least two of the at least two images to produce composite image data, and determine the size-related classification of the teat based on the composite image data. Thus, for example, a video sequence recorded by the three-dimensional camera may form the basis for highly accurate size measure of the teat.

According to a further embodiment of this aspect of the invention, the processing unit is configured to calculate the at least one size measure for at least one teat of each of a number of animals in a group of animals. Then, based on an analysis (e.g. statistical analysis) of the at least one size measure for said at least one teat of each animal, the processing unit is configured to determine a common size-related classification for said at least one teat of each animal. Preferably, the processing unit is also configured to determine a collective recommended teatcup liner for the group of animals based on the common size-related classification. Hence, a farmer can be advised of an appropriate teatcup liner for his or her livestock, or part thereof.

According to yet another embodiment of this aspect of the invention, it is presumed that the arrangement is associated with at least two milking installations each of which is configured to extract milk from identified individuals within the group of animals. Moreover, the processing unit is configured to determine a first common size-related classification for a first subgroup of animals within the group of animals, which first common size-related classification is associated with a first teatcup liner used in a first milking installation of the at least two milking installations; and determine a second common size-related classification for a second subgroup of animals within the group of animals, which second common size-related classification is associated with a second teatcup liner used in a second milking installation of the at least two milking installations. Thereby, the arrangement may assist a famer to subdivide a livestock of animals into two or more smaller groups depending on the teat measures and which teatcup liner that is suitable for the members of each smaller group.

According to still another embodiment of this aspect of the invention, the three-dimensional camera is further configured to forward the recorded image data to a control unit in the automatic milking system, which control unit is configured to control a movable robot arm. Consequently, the three-dimensional camera may be a resource common for other functions of an automatic milking installation, such as a milking robot. Clearly, for cost efficiency, this is desirable.

According to another aspect of the invention, the object is achieved by the method described initially, wherein at least one size measure of the teat is calculated based on the image data. Based on the at least one size measure, in turn, a size-related classification of the teat is determined. Finally, output data are presented which reflect the size-related classification of the teat via a user interface. The advantages of this method, as well as the preferred embodiments thereof, are apparent from the discussion above with reference to the proposed system.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
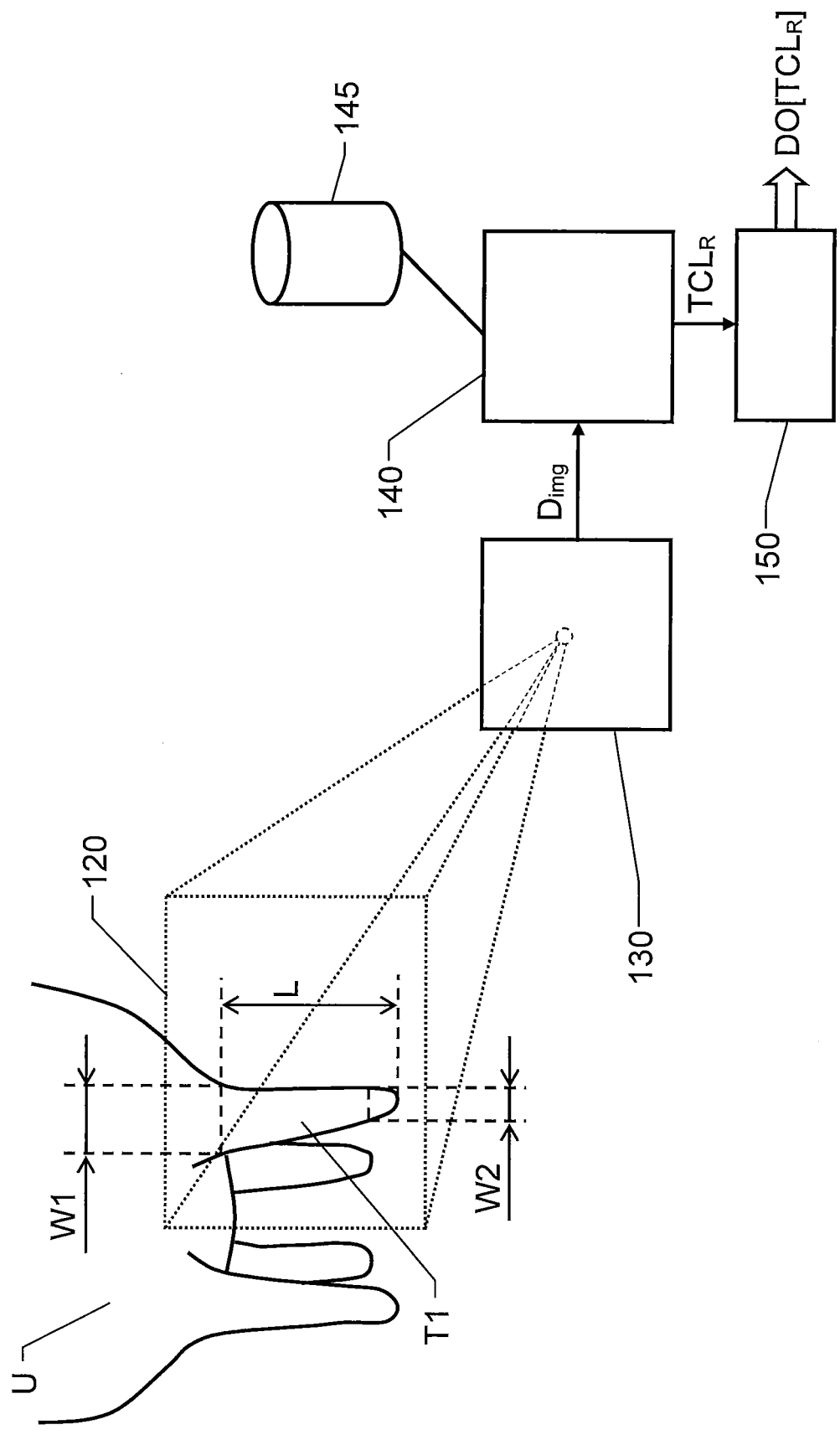
FIG. 1 shows an overview of a proposed arrangement.

FIG. 1 shows a general example of an arrangement according to the invention. The arrangement is intended to be included in automatic milking system containing one or more milking installations. The arrangement includes a three-dimensional camera 130, a processing unit 140 and a user interface 150, for example represented by a display unit and/or a loudspeaker.

The three-dimensional camera 130 is configured to record image data $D_{img}$ representing an outer surface of a teat T1 of a dairy animal in three dimensions. Thus, as mentioned above, the three-dimensional camera 130 may for instance include a ToF camera, a structured-light 3D scanner, or any other light-pattern-projection based image registering means, as well as a stereo camera adapted to measure distances in three dimensions.

The ToF camera is a range imaging camera system that resolves distance based on the known speed of light. The ToF camera measures the time-of-flight of a light signal between the camera and the subject for each point of the image. Analogous to a radar unit, the ToF camera is a kind of scannerless LIDAR (Light Detection And Ranging) equipment, in which an entire scene is captured with each laser or light pulse. A scanning LIDAR system, on the other hand, uses a point-by-point laser beam to gradually sweep over a scene and register the distances to various objects therein.

In its most basic form, the structured-light 3D scanner has a projector, which projects a narrow band of light onto the three-dimensionally shaped surfaces of a scene to be recorded. This produces a line of illumination that appears distorted from other perspectives than that of the projector. This, in turn, can be used for a geometric reconstruction of the surface shape onto which the band of light is projected. A faster and more versatile approach involves projection of patterns consisting of many stripes at once, or of arbitrary fringes. Namely, this allows for the acquisition of a multitude of samples simultaneously. Seen from different viewpoints, the pattern appears geometrically distorted due to the surface shape of the object. Various analyses are applied to determine these shapes based on the distortions.

A rudimentary alternative to the most basic form of the structured-light 3D scanner can be obtained by projecting a simple pattern of regularly arranged dots or lines onto the scene to be recorded. Then, provided that the distance between the camera and the scene is known (e.g. from the camera's focal distance), various measures and distances in the scene are determined by counting the number of dots/lines between different points in an image of the scene.

A stereo camera is a type of camera with two or more lenses with a separate image sensors for each lens. This allows the camera to simulate human binocular vision, and therefore gives it the ability to capture three-dimensional images. The distance between the lenses in a typical stereo camera is about the distance between the eyes of a human being, i.e. around 6.5 cm. However, a longer base line produces more extreme three-dimensionality and allows for distance determination with better accuracy.

The processing unit 140 is configured to receive the recorded image data $D_{img}$, and based thereon, provide a geometric analysis of the teat T1. More precisely, the processing unit 140 is configured to calculate at least one size measure W1, W2 and/or L of the teat T1 based on the image data $D_{img}$. Here, a first size measure W1 may represent a width of the teat T1 at its base, a second size measure W2 may represent a width of the teat T1 at its tip and a third measure L may represent a length of the teat T1. Moreover, the geometric analysis involves determining a size-related classification of the teat T1 based on the at least one size measure W1, W2 and/or L.

According to one embodiment of the invention, the size-related classification of the teat T1, in turn, is associated with a recommended teatcup liner $TCL_R$ for the dairy animal. This will be explained in more detail below with reference to FIGS. 2 and 3.

The processing unit 140 is arranged for classifying the teats of dairy animals with respect to the size measures of the teats. The udder U of a standard cow normally has four teats, and preferably these teats are classified/categorized individually for each animal of a herd. Further preferably, the classification is updated repeatedly to maintain good data quality, also when the members of the herd are aging and/or are exchanged. Namely, with knowledge about the classification, in turn, the farmer can adapt the milking equipment to suit his/her herd of animals. This may involve selecting a type of teatcup liner that is considered to be appropriate with respect to the size measures of all teats in the herd. If the variation in teat size measures proves to be especially high within the herd, it may be appropriate to divide the herd into two or more subdivisions and regard each of these subdivisions of animals as a new herd for which an appropriate teatcup liner shall be selected.

To determine adequate size-related classifications and to recommended suitable teatcup liners $TCL_R$, the processing unit 140 is preferably communicatively connected to a database 145 containing a set of size-related classifications and their respective measurement characteristics. Thereby, the processing unit 140 can determine a size-related classification for the teat T1 through a simple look-up operation in the database 145.

The proposed arrangement further includes a user interface 150 configured to present output data DO[$TCL_R$] reflecting the size-related classification of the teat. Preferably, the user interface 150 contains a graphical and/or text display where the output data DO[$TCL_R$] can be presented graphically and/or in text form. However, according to the invention, also alternative user interfaces 150 are conceivable, such as an acoustic interface configured to for example present the output data DO[$TCL_R$] in the form of a synthetic voice message.

Figures 2, 3:
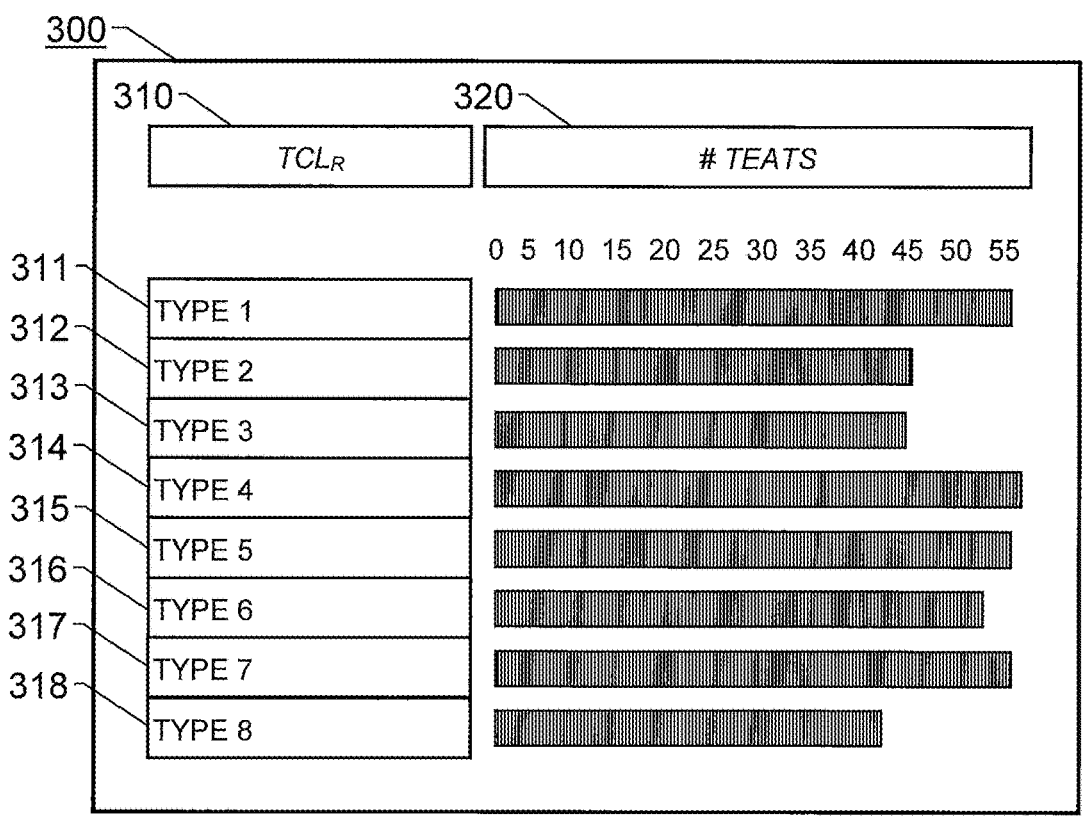
FIGS. 2-3 show examples of screen windows that may be shown on a graphical display of the proposed arrangement according to embodiments of the invention.

FIG. 2 shows a first example of a screen window 200 that may be shown on a graphical display of the user interface 150 according to one embodiment of the invention.

In the example represented in FIG. 2, the screen window 200 shows a set of size-related classifications 210 and corresponding intervals of measures 220 in terms of length L and average width $W_{avg}$ as follows:

- a first category "short and thin" 211 to which teats shorter than 35 mm and thinner 24 mm belong;
- a second category "short and average" 212 to which teats shorter than 35 mm and between 24 mm and 27 mm in width belong;
- a third category "short and wide" 213 to which teats shorter than 35 mm and over 27 mm wide belong;
- a fourth category "average and thin" 214 to which teats between 35 mm and 60 mm long and thinner than 24 mm belong;
- a fifth category "average" 215 to which teats between 35 mm and 60 mm long and between 24 mm and 27 mm in width belong;
- a sixth category "average and wide" 216 to which teats between 35 mm and 60 mm long and over 27 mm wide belong;
- a seventh category "long and thin" 217 to which teats longer than 60 mm and thinner than 24 mm belong;
- an eighth category "long and average" 218 to which teats longer than 60 mm and between 24 mm and 27 mm in width belong; and
- a ninth category "long and wide" 219 to which teats between longer than 60 mm and wider than 27 mm belong.

A rightmost column of the screen window 200 in FIG. 2 shows a number of teats 230 having been categorized in each of the above categories 211 through 219 in this example.

FIG. 3 shows a second example of a screen window 300 that may be displayed on a graphical display of the user interface 150 according to one embodiment of the invention.

The screen window 300 of FIG. 3 shows a first column 310 reflecting a recommended teatcup liner $TCL_R$ for a dairy animal having teats that belong to a particular category 310, and a second column 320 shows a number of teats for which each respective teatcup liner $TCL_R$ is recommended in this example.

Here, a first teatcup liner "type 1" 311 is recommended for 56 teats, a second teatcup liner "type 2" 312 is recommended for 45 teats, a third teatcup liner "type 3" 313 is recommended for 44 teats, a fourth teatcup liner "type 4" 314 is recommended for 58 teats, a fifth teatcup liner "type 5" 315 is recommended for 56 teats, a sixth teatcup liner "type 6" 316 is recommended for 53 teats, a seventh teatcup liner "type 7" 317 is recommended for 56 teats, and an eighth teatcup liner "type 8" 318 is recommended for 42 teats.

According to the invention, alternatively or additionally, either one or both of the screen windows 200 and 300 may be displayed on a display unit (not shown) that is connected to the proposed arrangement.

Although it is generally preferable, a one-to-one relationship between the categories 210 and recommended teatcup liners $TCL_R$ 310 is not necessary. In fact, according to the invention, any other relationship is likewise conceivable.

For improved data quality, according embodiments of the invention, the processing unit 140 is configured to calculate the at least one size measure W1, W2 and/or L of the teat T1 based on image data $D_{img}$ recorded in the form of at least two images, for instance forming part of a sequence of images recorded by the three-dimensional camera 130, e.g. as a video file.

In such a case, the processing unit 140 is configured to combine image data $D_{img}$ from at least two of the at least two images to produce composite image data, and determine the size-related classification of the teat T1 based on the composite image data.

Thereby, relatively accurate geometric data can be derived also if each individual image has comparatively low resolution.

According one embodiment of the invention, the proposed arrangement is used to handle a herd of animals. This means that the processing unit 140 is configured to calculate the at least one size measure W1, W2 and/or L for at least one teat T1 of each animal of a number of animals in a group of animals, either the entire herd or a sub-group thereof. Further, the processing unit 140 is configured to determine a common size-related classification for the at least one teat T1. Here, the common size-related classification is based on an analysis of the at least one size measure W1, W2 and/or L for the at least one teat T1. For example, the processing unit 140 may perform a statistical analysis of one or more of the size measures W1, W2 and L for the at least one teat T1. Alternatively, the processing unit 140 may simply determine the common size-related classification for the at least one teat T1 to be equal to the most frequent classification in the group of animals.

Preferably, the processing unit 140 is also configured to determine a collective recommended teatcup liner $TCL_R$ for the group of animals based on the common size-related classification.

In practice, however, it is not always possible to identify one single teatcup liner $TCL_R$ that is suitable for all the animals in a given group. The situation illustrated in FIG. 3 represents such an example.

Therefore, according to one embodiment of the invention, it is assumed the arrangement is associated with at least two milking installations, where each milking installation is configured to extract milk from identified individuals within the group of animals. In other words, some animals are milked by one milking installation, and the other animals are milked by one or more other milking installations.

Here, the processing unit 140 is configured to determine a first common size-related classification for a first subgroup of animals within the group of animals. The first common size-related classification is associated with a first teatcup liner $TCL_R$, say type 1 in FIG. 3, that is used in a first milking installation. The processing unit 140 is also configured to determine a second common size-related classification for a second subgroup of animals within the group of animals. The second common size-related classification is associated with a second teatcup liner $TCL_R$, say type 4 in FIG. 3, that is used in a second milking installation.

Of course, analogously, if the arrangement is associated with three or more milking installation, the group of animals can be divided into further sub-groups; where, in each sub-group, the teatcup liner $TCL_R$ used has been selected with respect to the size-related classification of the animals' teats.

Preferably, for efficient use of the equipment, the three-dimensional camera 130 is also configured to forward the recorded image data $D_{img}$ to other functions in the milking installation, for example to a control unit in the automatic milking system that is responsible for controlling a movable robot arm. In fact, since modern milking installations often already include a three-dimensional camera 130, this camera can be employed for the proposed arrangement as well.

It is generally advantageous if the processing unit 140 is configured to effect the above-mentioned procedure in a fully automatic manner, for instance by executing a computer program. Therefore, the processing unit 140 may be communicatively connected to a memory unit storing a computer program product, which, in turn, contains software for making at least one processor in the processing unit 140 execute the above-described actions when the computer program product is run on the processing unit 140.

Figure 4:
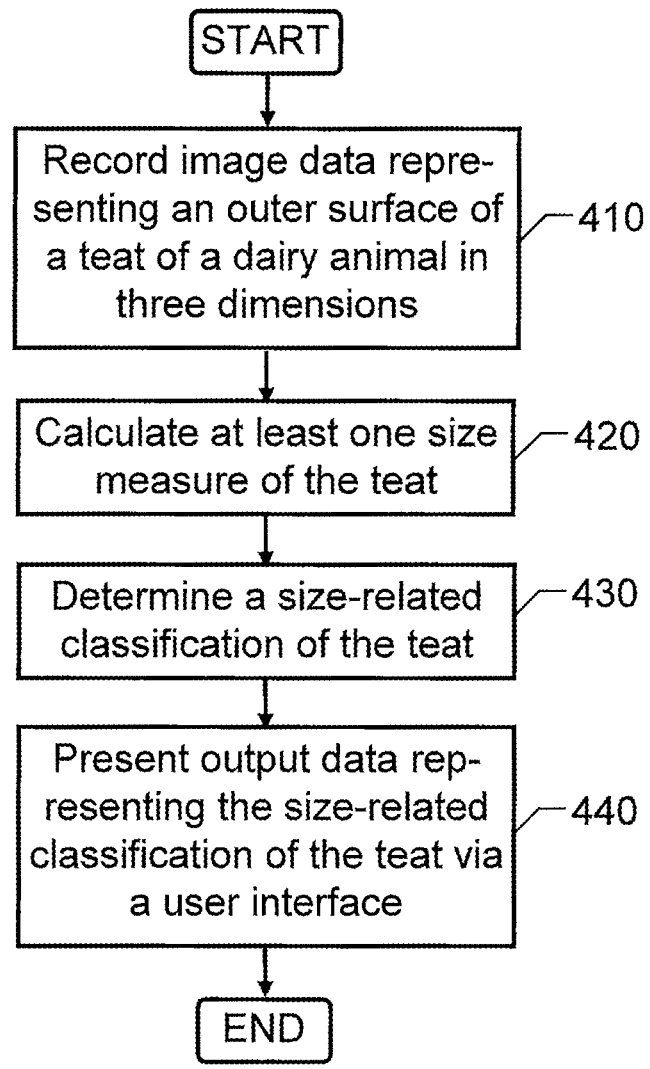
FIG. 4 illustrates, by means of a flow diagram, the general method according to the invention.

In order to sum up, and with reference to the flow diagram in FIG. 4, we will now describe the general method according to the invention for classifying teats with respect to size measures.

In a first step 410, using a three-dimensional camera, image data are recorded that represent an outer surface of a teat of a dairy animal in three dimensions. Then, in a step 420, at least one size measure of the teat is calculated based on the image data recorded in step 410.

In a subsequent step 430, a size-related classification of the teat is determined based on the at least one size measure.

Thereafter, a step 440 presents output data representing the size-related classification of the teat via a user interface, such as a visually on graphical display, and/or acoustically via a loudspeaker.

All of the process steps, as well as any sub-sequence of steps, described with reference to FIG. 4 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An arrangement for an automatic milking system, the arrangement comprising:
   a three-dimensional camera configured to record image data representing an outer surface of a teat of a dairy animal in three dimensions; and
   a processing unit configured to:
      receive the recorded image data,
      calculate at least one size measure of the teat based on the image data, and
      provide a geometric analysis of the teat including determining a size-related classification of the teat based on the at least one size measure out of a plurality of size-related classifications, each of the size-related classifications defining one or more of a range of teat width and a range of teat length; and
   a user interface configured to present output data reflecting the size-related classification of the teat,
   wherein the processing unit is further configured to:
      calculate the at least one size measure for at least one teat of each of a number of animals in a group of animals, and
      determine a common size-related classification for said at least one teat, the common size-related classification being based on an analysis of the at least one size measure for said at least one teat.

2. The arrangement according to claim 1, wherein the processing unit is configured to calculate the at least one size measure of the teat based on the image data recorded in the form of at least two images.

3. The arrangement according to claim 2, wherein the processing unit is further configured to:
   combine image data from at least two of the at least two images to produce composite image data, and
   determine the size-related classification of the teat based on the composite image data.

4. The arrangement according to claim 2, wherein the at least two images form part of a sequence of images recorded by the three-dimensional camera.

5. The arrangement according to claim 1, wherein the three-dimensional camera is further configured to forward the recorded image data to a control unit in the automatic milking system, the control unit being configured to control a movable robot arm.

6. An arrangement for an automatic milking system, the arrangement comprising:
   a three-dimensional camera configured to record image data representing an outer surface of a teat of a dairy animal in three dimensions; and
   a processing unit configured to:
      receive the recorded image data, calculate at least one size measure of the teat based on the image data, and provide a geometric analysis of the teat including determining a size-related classification of the teat based on the at least one size measure out of a plurality of size-related classifications, each of the size-related classifications defining one or more of a range of teat width and a range of teat length; and a user interface configured to present output data reflecting the size-related classification of the teat, wherein the processing unit is further configured to:

determine a recommended teatcup liner for the dairy animal based on the size-related classification of the teat, calculate the at least one size measure for at least one teat of each of a number of animals in a group of animals, and determine a common size-related classification for said at least one teat, the common size-related classification being based on an analysis of the at least one size measure for said at least one teat.

7. The arrangement according to claim 6, wherein the processing unit is further configured to determine a collective recommended teatcup liner for the group of animals based on the common size-related classification.

8. The arrangement according to claim 6, wherein the arrangement is associated with at least two milking installations, each of the at least one milking installations being configured to extract milk from identified individuals within said group of animals, and the processing unit is further configured to:

determine a first common size-related classification for a first subgroup of animals within said group of animals, the first common size-related classification being associated with a first teatcup liner used in a first milking installation of said at least two milking installations, and determine a second common size-related classification for a second subgroup of animals within said group of animals, the second common size-related classification being associated with a second teatcup liner used in a second milking installation of said at least two milking installations.

9. A method implemented in an arrangement for an automatic milking system, the method comprising:

recording image data representing an outer surface of a teat of a dairy animal in three dimensions;

providing a geometric analysis of the teat based on the image data by calculating at least one size measure of the teat based on the image data, and determining a size-related classification of the teat based on the at least one size measure out of a plurality of size-related classifications, each of the size-related classifications defining one or more of a range of teat width and a range of teat length;

calculating the at least one size for at least one teat of each of a number of animals in a group of animals;

determining a common size-related classification for said at least one teat, the common size-related classification being based on an analysis of the at least one size measure for said at least one teat;

presenting output data reflecting the size-related classification of the teat via a user interface;

determining a recommended teatcup liner for the dairy animal based on the size-related classification of the teat; and determining a collective recommended teatcup liner for the group of animals based on the common size-related classification.

10. The method according to claim 9, wherein the at least one size measure of the teat is calculated based on image data recorded in the form of at least two images.

11. The method according to claim 10, further comprising:

combining image data from at least two of the at least two images to produce composite image data, and determining the size-related classification of the teat based on the composite image data.

12. The method according to claim 10, wherein the at least two images form part of a sequence of images recorded by a three-dimensional camera.

13. The method according to claim 9, further comprising:

determining a first common size-related classification for a first subgroup of animals within said group of animals, the first common size-related classification being associated with a first teatcup liner used in a first milking installation of said at least two milking installations, and determining a second common size-related classification for a second subgroup of animals within said group of animals, the second common size-related classification being associated with a second teatcup liner used in a second milking installation of said at least two milking installations.

14. An arrangement for an automatic milking system, the arrangement comprising:

a three-dimensional camera configured to record image data representing an outer surface of at least one teat of each of a number of dairy animals in a group of animals in three dimensions; and a processing unit configured to:

receive the recorded image data, calculate at least one size measure of the at least one teat of each of the number of dairy animals in the group of animals, based on the image data, provide a geometric analysis of the at least one teat including determining a common size-related classification of the at least one teat based on the at least one size measure for the at least one teat; and a user interface configured to present output data reflecting the common size-related classification of the teat.

15. The arrangement according to claim 14, wherein the processing unit is further configured to determine a collective recommended teatcup liner for the group of animals based on the common size-related classification, and the output data reflects the collective recommended teatcup liner.

16. A method implemented in an arrangement for an automatic milking system, the method comprising:

recording image data representing an outer surface of at least one teat of each of a number of dairy animals in a group of animals in three dimensions;

providing a geometric analysis of the at least one teat based on the image data by calculating at least one size measure of the at least one teat of each of the number of animals in the group of animals, based on the image data, and determining a common size-related classification of the at least one teat based on the at least one size measure for the at least one teat; and presenting output data reflecting the common size-related classification of the at least one teat via a user interface.

\* \* \* \* \*